(12) United States Patent
Austen et al.

(10) Patent No.: US 6,834,363 B2
(45) Date of Patent: Dec. 21, 2004

(54) METHOD FOR PRIORITIZING BUS ERRORS

(75) Inventors: Christopher Harry Austen, Austin, TX (US); Michael Anthony Perez, Cedar Park, TX (US); Mark Walz Wenning, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 525 days.

(21) Appl. No.: 09/815,543

(22) Filed: Mar. 22, 2001

(65) Prior Publication Data

US 2002/0178404 A1 Nov. 28, 2002

(51) Int. Cl.[7] ............................................... G06F 11/00
(52) U.S. Cl. ......................................... 714/44; 714/26
(58) Field of Search ............................. 714/26, 44, 48, 714/47, 57

(56) References Cited

U.S. PATENT DOCUMENTS

| | | | | | |
|---|---|---|---|---|---|
| 5,596,716 A | * | 1/1997 | Byers et al. | ................... | 714/48 |
| 5,666,485 A | * | 9/1997 | Suresh et al. | ................. | 714/48 |
| 5,701,409 A | * | 12/1997 | Gates | .......................... | 714/41 |
| 5,708,775 A | * | 1/1998 | Nakamura | .................... | 714/48 |
| 6,012,152 A | * | 1/2000 | Douik et al. | ................... | 714/26 |
| 6,430,164 B1 | * | 8/2002 | Jones et al. | .................. | 370/313 |
| 6,650,949 B1 | * | 11/2003 | Fera et al. | ..................... | 700/79 |
| 2002/0124215 A1 | * | 9/2002 | Austen et al. | ................. | 714/57 |
| 2002/0178404 A1 | * | 11/2002 | Austen et al. | ................. | 714/43 |

\* cited by examiner

*Primary Examiner*—Robert Beausoliel
*Assistant Examiner*—Bryce P. Bonzo
(74) *Attorney, Agent, or Firm*—Duke W. Yee; Mark E. McBurney; Lisa L. B. Yociss

(57) ABSTRACT

A method for prioritizing bus errors for a computing system is provided. A subsystem test is executed on a first subsystem from a plurality of subsystems on a bus system, wherein the subsystem test on the bus system is specific to the first bus subsystem. An output is received in response to executing the subsystem test. In response to the output indicating an error on the first subsystem, a severity level is assessed based on the error. For all subsystems from the plurality of subsystems on the bus system, a subsystem test is executed on each remaining subsystem, wherein each subsystem test on the bus system is specific to each remaining subsystem. An output is received in response to executing each subsystem test. In response to the output indicating an error on any of the remaining subsystems, a severity level is assessed based on the error.

40 Claims, 9 Drawing Sheets

```
enum pci_error_type{
    pci_error_type_none=0,
    pci_error_type_unknown=1,
    pci_error_type_Internal=2,    }902
    pci_error_hard=3,
    pci_error_parity=4
};

enum pci_error_op {
    pci_error_op_none=0,
    pci_error_op_unknown=1,
    pci_error_op_data_read=2,    }904
    pci_error_op_data_write=3,
    pci_error_op_addr=4,
};
```

```
     // Calculation of severity level
     // PCI_ERROR_TYPE,
     // pci_error_type_none,
     // pci_error_type_unknown,
906{ // pci_error_type_internal,
     // pci_error_type_hard,
     // pci_error_type_parity
     // ----------------
     //      (enumerated value)    x10
     //
```

```
(PCI_ERROR_TYPE*10) + (PCI_ERROR_OP)
    PCI_ERROR_OP
    pci_error_op_none,
    pci_error_op_unknown,
    pci_error_op_data_read,
    pci_error_op_data_write,
    pci_error_op_addr
    ----------------
  +    (enumerated value)
```

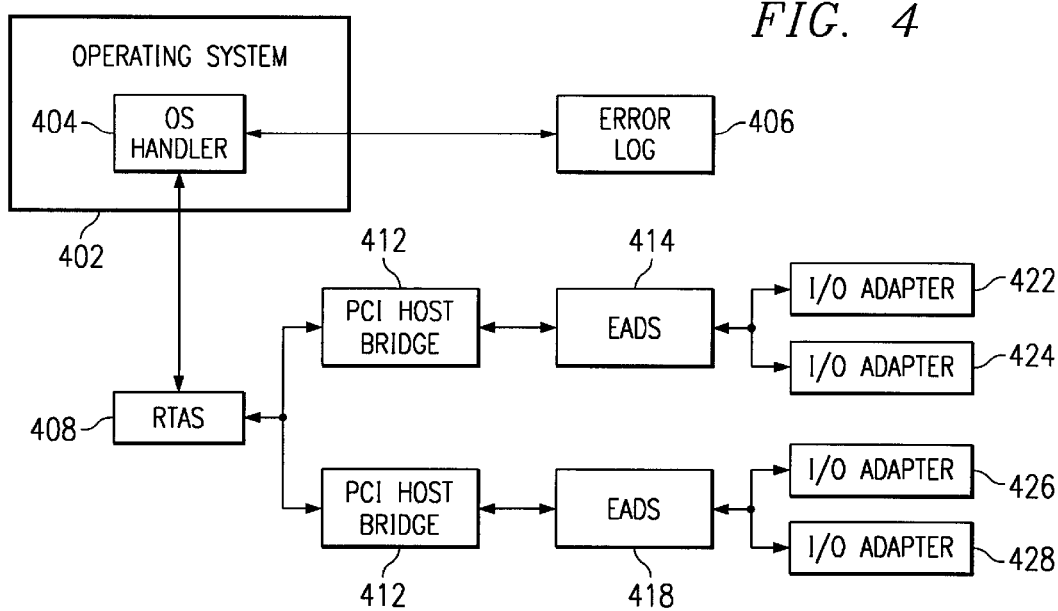

FIG. 4

```
enum pci_error_type{
    pci_error_type_none=0,
    pci_error_type_unknown=1,
    pci_error_type_Internal=2,
    pci_error_hard=3,
    pci_error_parity=4
};
```
} 902

```
enum pci_error_op {
    pci_error_op_none=0,
    pci_error_op_unknown=1,
    pci_error_op_data_read=2,
    pci_error_op_data_write=3,
    pci_error_op_addr=4,
};
```
} 904

```
// Calculation of severity level          (PCI_ERROR_TYPE*10) + (PCI_ERROR_OP)
// PCI_ERROR_TYPE,                           PCI_ERROR_OP
// pci_error_type_none,                      pci_error_op_none,
// pci_error_type_unknown,                   pci_error_op_unknown,
// pci_error_type_internal,                  pci_error_op_data_read,
// pci_error_type_hard,                      pci_error_op_data_write,
// pci_error_type_parity                     pci_error_op_addr
// ------------------                        ------------------
//     (enumerated value)    x10    +        (enumerated value)
//
```
906

ERROR LOG
500

```
LABEL: MACHINE_CHECK_CHRP
IDENTIFIER: 56CDC3C8

Date/Time:    Wed Apr 12 17:08:59
Sequence Number: 3326
Machine Id:   000B519D4C00
Node Id:      176net101
Class:   H
Type:    PERM
Resource Name:  sysplanar0
Resource Class: planar
Resource Type:  sysplanar_rspc
Location:  00-00

Description
MACHINE CHECK

Probable Causes
UNDETERMINED

Failure Causes
PROCESSOR MACHINE CHECK

Recommended Actions
  RUN SYSTEM DIAGNOSTICS.

Detail Data
MACHINE STATUS SAVE/RESTORE REGISTER 0
0000 0000 07F5 8B60
MACHINE STATUS SAVE/RESTORE REGISTER 1
0000 0000 0000 1010
PROBLEM DATA
0394 2203 0000 019A C600 9300 2209 0000 2000 0412 2004 4058 008B 1014 0201 0000
0000 0000 00FF 0000 0000 0000 0000 0000 4942 4D00 5530 2E32 2D50 312D 4931 0000
0010 4646 0406 0000 0000 0000 0000 0000 0010 4646 0406 0010 0000 0000 0000 0000
000C 4646 0406 0028 0000 0800 0010 4646 0406 0020 0000 0000 0000 0000 0010 4646
0406 0068 0000 0000 0000 0000 0010 4646 0406 0070 0000 0000 0000 0000 0010 4646
0406 0100 0000 0040 0000 0000 0010 4646 0406 0110 0000 0000 0000 0000 000C 4646
0406 0128 0000 0800 0010 4646 0406 0120 0000 0000 0000 0000 0010 4646 0406 0168
0000 0000 0000 0000 0010 4646 0406 0170 0000 0000 0000 0000 000C 4646 0406 0180
0000 0000 000C 4646 0406 0130 2001 0000 000C 4646 0406 0140 1001 0000 000C 4646
0406 0181 0000 0000 000C 4646 0406 0182 0300 9710 000C 4646 0406 0183 0000 0000
000C 4646 0406 0184 031B 35B4 000C 4646 0406 0185 F740 0800 000C 4646 0406 0130
2001 0000 000C 4646 0406 0140 1001 0000 000C 4646 0406 0180 0000 0000 000C 4646
0F01 0001 4420 0147 000C 4646 0F01 0006 F843 4100 000C 4646 0F01 0007 0000 A420
0002 0000 0000 0000 0000 0000 0000 0000 0000 0000 0000 0000 0000 0000 0000 0000
0000 0000 0000 0000 0000 0000 0000 0000 0000 0000 0000 0000 0000 0000 0000 0000
```

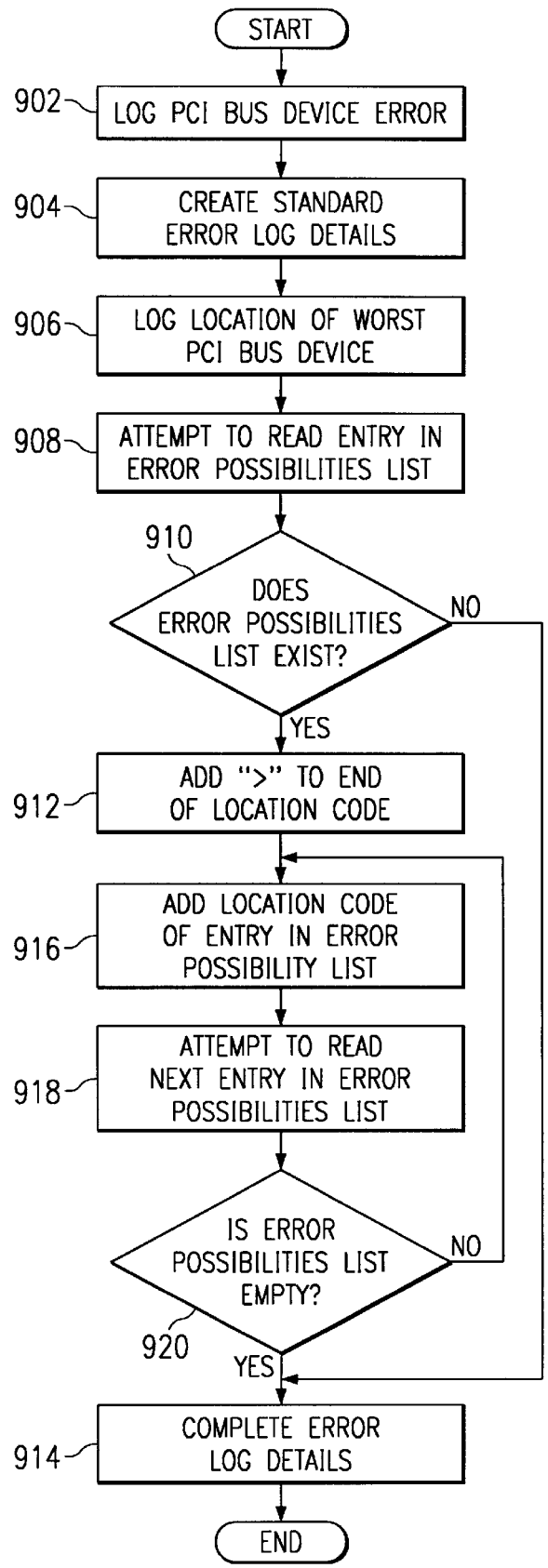

METHOD FOR PRIORITIZING BUS ERRORS

BACKGROUND OF THE INVENTION

1. Technical Field

The present invention relates generally to the field of computer architecture and, more specifically, to methods and systems for managing machine check interrupts during runtime.

2. Description of Related Art

As computers become more sophisticated, diagnostic and repair processes have become more complicated and require more time to complete. A service technician may "chase" errors through lengthy diagnostic procedures in an attempt to locate one or more components that may be causing the errors within the computer. Diagnostic procedures generally specify several possible solutions to an error or problem in order to guide a technician to a determination and subsequent resolution of the problem. However, diagnostic procedures generally point to a component that is a likely candidate for the error, and if the component is determined to be reliable, the problem may remain unresolved until the next error occurs. In addition to paying for new components, a business must also pay for the recurring labor costs of the service technician and lost productivity of the user of the error-prone computer.

Most computing systems use some sort of surveillance to help detect system problems during operation of the computing system. Surveillance is a communication system between the operating system, e.g. Advanced Interactive executive (AIX), and a support system, e.g. a service processor. With typical surveillance, both the operating system and the support system send "heartbeat" messages to each other on a periodic basis. If either does not receive the heartbeat message from the other within a given period of time, it assumes that the other component has failed. As a result, the failure will be logged in a corresponding error log indicating that a repair action is necessary. However, in some instances reporting a first error found in the machine check is not necessarily the actual cause of the machine check.

Therefore, a method and system to prioritize multiple errors reported from a PCI bus and order the errors in a systematic list would be desirable.

SUMMARY OF THE INVENTION

The present invention provides a method for prioritizing bus errors for a computing system. A subsystem test is executed on a first subsystem from a plurality of subsystems on a bus system, wherein the subsystem test on the bus system is specific to the first bus subsystem. An output is received in response to executing the subsystem test. In response to the output indicating an error on the first subsystem, a severity level is assessed based on the error. For all subsystems from the plurality of subsystems on the bus system, a subsystem test is executed on each remaining subsystem, wherein each subsystem test on the bus system is specific to each remaining subsystem. An output is received in response to executing each subsystem test. In response to the output indicating an error on any of the remaining subsystems, a severity level is assessed based on the error.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a block diagram of a system for handling machine check interrupts without the necessity of powering down the system is depicted in accordance with the present invention;

FIG. 5 depicts an exemplary table depicting possible contents and information contained within an error log in accordance with the present invention;

FIG. 9 depicts a flowchart illustrating an exemplary process of developing a systematic list for displaying errors prioritized by an error severity factor in accordance with a preferred embodiment of the present invention; and FIG. 10 depicts a check-exception code to report the findings of errors back to an operating system in accordance with a preferred embodiment of the present invention.

DETAILED DESCRIPTION OF THE PREFERRED EMBODIMENT

Figure 1:
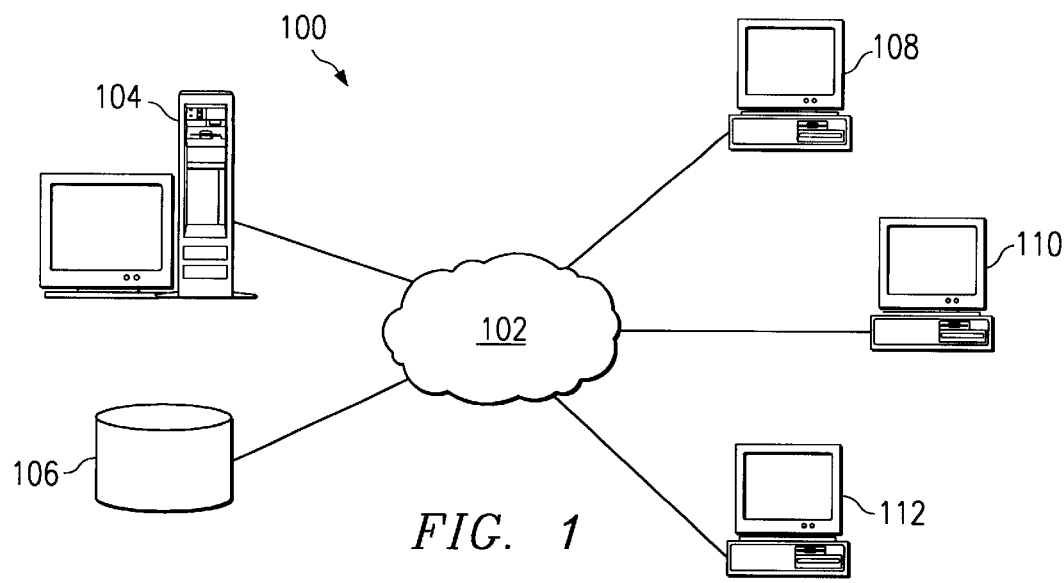
FIG. 1 is a pictorial representation of a networked data processing system in which the present invention may be implemented.

With reference now to the figures, and in particular with reference to FIG. 1 which is a pictorial representation of a networked data processing system in which the present invention may be implemented.

Networked data processing system 100 is a network of computers in which the present invention may be implemented. Networked data processing system 100 contains a network 102, which is the medium used to provide communications links between various devices and computers connected together within networked data processing system 100. Network 102 may include wireline connections, such as copper wire or fiber optic cables, and wireless connections, such as cellular telephone connections. Also, the connections for network 102 may be either permanent, such as with a dedicated line, and/or temporary, such as connections made through dial up telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In a multi-tier networked environment, networked applications are provided in which a portion of the application is located on a server, such as server 104 and another portion of the application is located on a client, such as client 108. In this implementation, the client is considered a first tier system while the server is considered a second tier system.

Networked data processing system 100 may include additional servers, clients, and other devices not shown. In the depicted example, networked data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, networked data processing system 100 also may be implemented as an number of different types of networks, such as, for example, an intranet or a local area network.

FIG. 1 is intended as an example, and not as an architectural limitation for the processes of the present invention. For example, network 102 may use other hardware devices, such as, plotters, optical scanners, and the like in addition or in place of the hardware depicted in FIG. 1.

Figure 2:
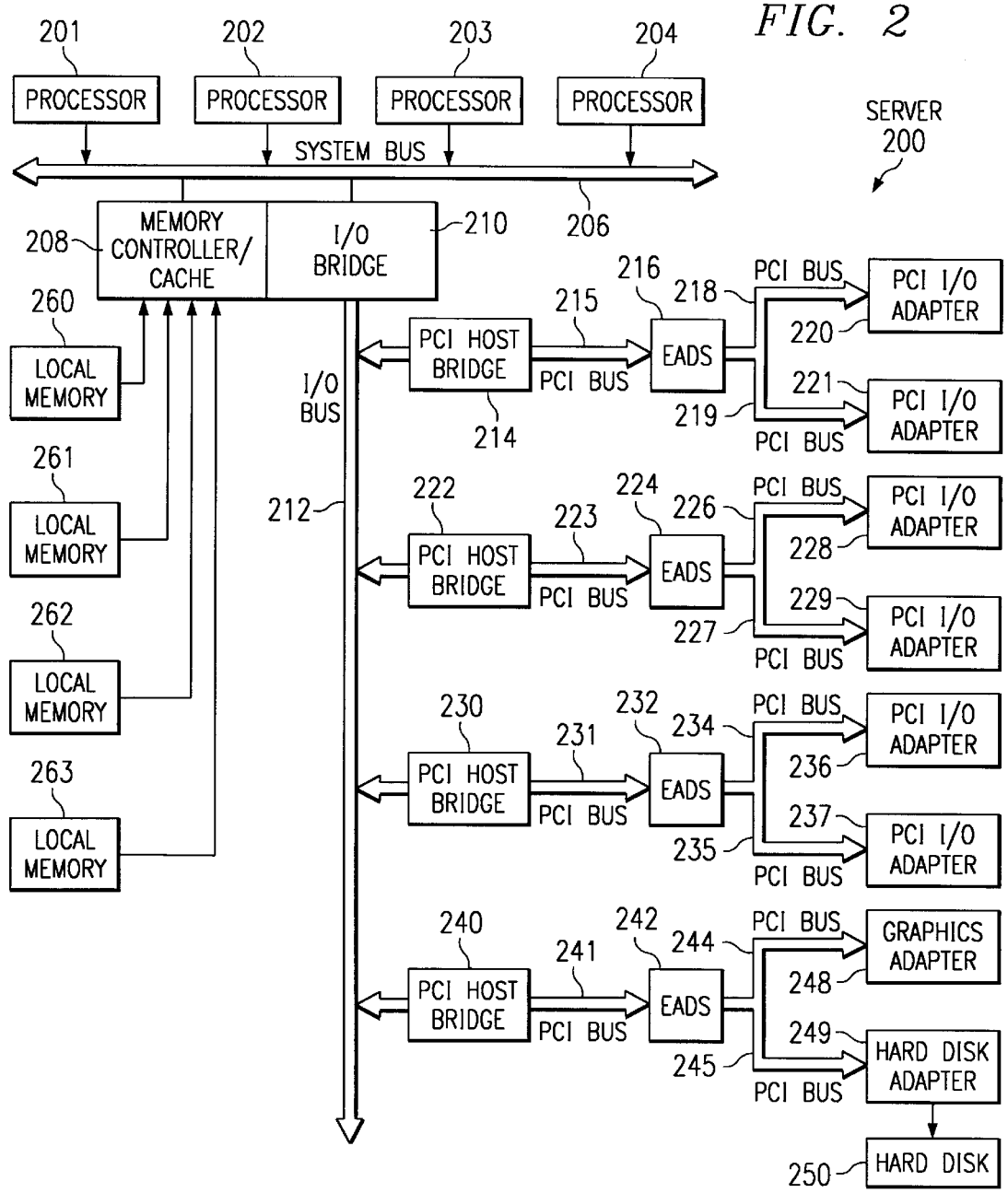
FIG. 2 depicts a block diagram of a data processing system which may be implemented as a server in which the present invention may be implemented.

FIG. 2 depicts a block diagram of a data processing system which may be implemented as a server in which the present invention may be implemented. Data processing system 200 may be a symmetric multiprocessor (SMP) system including a plurality of processors 201, 202, 203, and 204 connected to system bus 206. For example, data processing system 200 may be an IBM RS/6000, a product of International Business Machines Corporation in Armonk, N.Y., implemented as a server within a network. Alternatively, a single processor system may be employed. Also connected to system bus 206 is memory controller/cache 208, which provides an interface to a plurality of local memories 260–263. I/O bus bridge 210 is connected to system bus 206 and provides an interface to I/O bus 212. Memory controller/cache 208 and I/O bus bridge 210 may be integrated as depicted.

Data processing system 200 is a logically partitioned data processing system. Thus, data processing system 200 may have multiple heterogeneous operating systems (or multiple instances of a single operating system) running simultaneously. Each of theses multiple operating systems may have any number of software programs executing within in it. Data processing system 200 is logically partitioned such that different I/O adapters 220–221, 228–129, 236–237, and 246–247 may be assigned to different logical partitions.

Thus, for example, suppose data processing system 200 is divided into three logical partitions, P1, P2, and P3. Each of I/O adapters 220–221, 228–229, and 236–237, each of processors 201–204, and each of local memories 260–264 is assigned to one of the three partitions. For example, processor 201, memory 260, and I/O adapters 220, 228, and 229 may be assigned to logical partition P1; processors 202–203, memory 261, and I/O adapters 221 and 237 may be assigned to partition P2; and processor 204, memories 262–263, and I/O adapters 236 and 246–247 may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 214 connected to I/O bus 212 provides an interface to primary PCI local bus 215. A number of Input/Output adapters 220–221 may be connected to primary PCI bus 215 via respective secondary PCI buses 218–219 and external address strobe (EADS) 216. Typical PCI bus implementations will support between four and eight I/O adapters (i.e. expansion slots for add-in connectors). Each I/O Adapter 220–221 provides an interface between data processing system 200 and input/output devices such as, for example, other network computers, which are clients to data processing system 200. EADS 216, 224, 232, and 242 are multi-function PCI-PCI bridges that support hot plugging of I/O adapters on the secondary buses 218–219, 226–227, 234–235, and 244–245. Hot plugging allows the addition, removal, and replacement of I/O adapters 220–221, 228–229, 236–237, and 248–249 during runtime. Each adapter 220–221, 228–229, 236–237, and 248–249 has its own secondary PCI bus 218–219, 226–227, 234–235, and 244–245, which makes hot plugging possible. Each EADS 216, 224, 232, and 242 may be configured to function as a bridge from a primary bus 215, 223, 231, and 241 to up to eight secondary hot plug PCI busses 218–219, 226–227, 234–235, and 244–245. In the depicted embodiment primary PCI buses 215, 223, 231, and 241 are 64-bits wide, 3.3 volt (V) tolerant and run at between 16–66 MHz. Secondary PCI buses 218–219, 226–227, 234–235, and 244–245 are 32-bits wide, wherein each pair of secondary PCI buses 218–219, 226–227, 234–235, and 244–245 may be combined into a 64-bit wide bus.

Additional PCI host bridges 222 and 230 provide interfaces for additional primary PCI buses 223 and 231. Each of additional primary PCI buses 223 and 231 are connected to a respective one of EADS 224 and 232. Each of EADS 224 and 232 is connected to a plurality of secondary PCI buses 226–227 and 234–235 as depicted in FIG. 2. Secondary PCI buses 226–227 and 234–235 provide a connection between a plurality of PCI I/O adapters 228–229 and 236–237 to EADS 224 and 232. Thus, additional I/O devices, such as, for example, modems or network adapters may be supported through each of PCI I/O adapters 228–229 and 236–237. In this manner, data processing system 200 allows connections to multiple network computers.

A memory mapped graphics adapter 248 and hard disk 250 may also be connected to I/O bus 212 via EADS 242 and PCI Host Bridge 240. EADS 242 is connected to PCI Host Bridge 240 through primary PCI bus 241. Graphics adapter 248 is connected to EADS 242 through secondary PCI bus 244 and hard disk adapter 249, through which hard disk 250 is connected to data processing system 200, is connected to EADS 242 through secondary PCI bus 245. Hard disk 250 may be logically partitioned between various partitions without the need for additional hard disks. However, additional hard disks may be utilized if desired.

Those of ordinary skill in the art will appreciate that the hardware depicted in FIG. 2 may vary. For example, other peripheral devices, such as optical disk drives and the like, also may be used in addition to or in place of the hardware depicted. Furthermore, the present invention is not limited to implementation on a multiprocessor logically partitioned system, but may also be implemented on other types of data processing systems, such as, for example, a single processor system running a single image of an operating system, such as a typical personal computer. The depicted example is not meant to imply architectural limitations with respect to the present invention.

Figure 3:
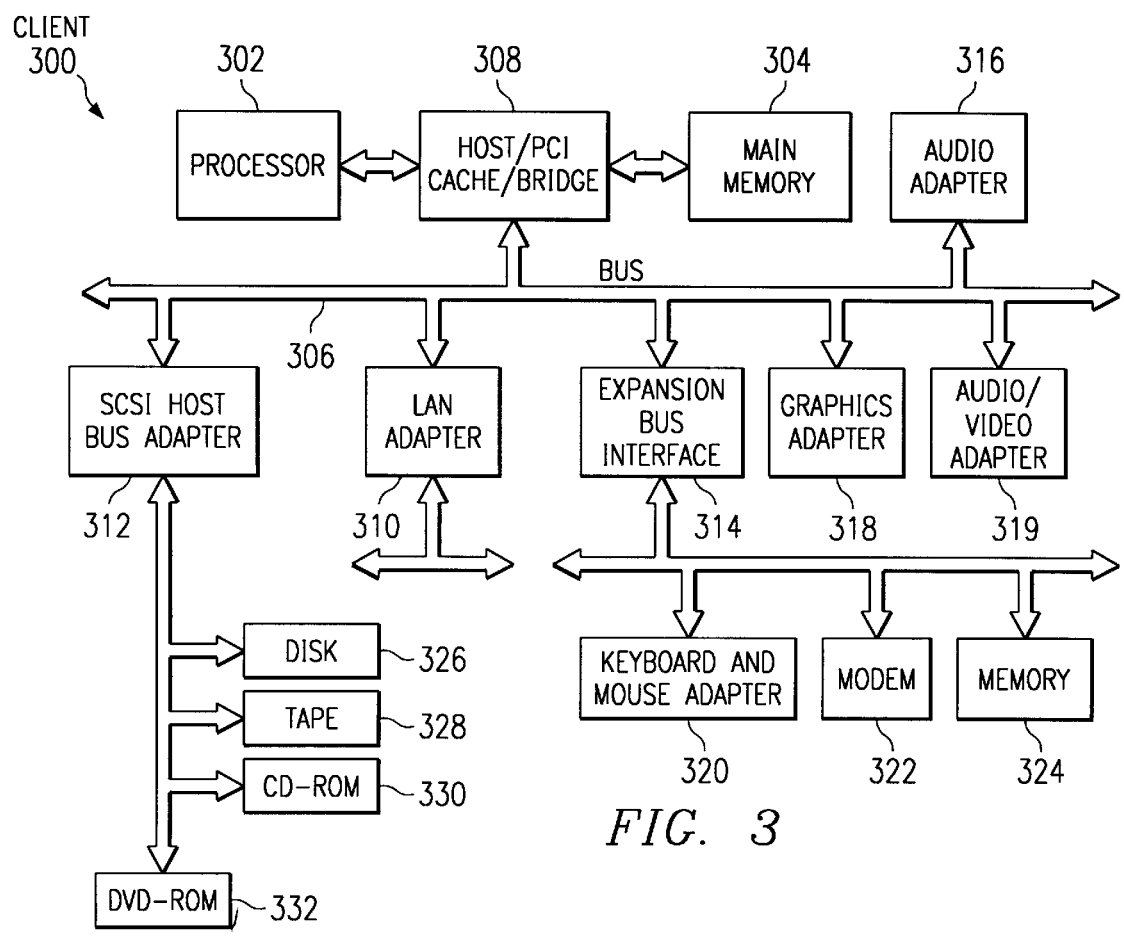
FIG. 3 is a block diagram of a data processing system which may be implemented as a client in which the present invention may be implemented.

FIG. 3 is a block diagram of a data processing system which may be implemented as a client in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows 2000, which is available from Microsoft Corporation. "Windows 2000" is a trademark of Microsoft Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to a multiprocessor data processing system.

The present invention provides a method to prioritize multiple errors reported from a PCI bus and order the errors in a systematic list. When a system makes a machine check, an operating system calls a routine to isolate an error that caused an exception. The error is reported back to the operating system in an error log. A routine searches for errors stored in registers and analyzes the errors as they are discovered. A severity factor is assigned to the error type and operation. The sum of the error type and operation severity factors determines the error severity level. Each error is then listed in a prioritized list. When the machine check is completed, the prioritized list is returned to the operating system.

When a machine check is received, a check-exception code searches through the PCI bus reading error registers along the way. When the check-exception code finds an error, the check-exception code analyzes the error. An error "type" and error "operation" are calculated. The error type and the error operation may range from a high value to a low value. The error type and error operation may be both assigned a number, for example, between 0 and 4. The error type number and the error operation number may be combined in a number of ways, for example, by adding a multiplier to at least one of the error type number and the error operation number and summing the two values. The combination of the error type number and the error operation number creates the error severity level.

A first detected error is recorded as the worst error. The check-exception code continues to scan the PCI bus for more errors. If a second error is detected, then the second error is analyzed for its severity similar to the first detected error. If the second error has a higher error severity level than the first detected error, the second detected error replaces the first detected error as the worst error and the first detected error is moved down a error severity list. If the second detected error severity level is less than the first detected error severity level, the second detected level is listed below the first detected error. The PCI bus continues to be analyzed until all items on the PCI bus have been checked for errors. Once all items on the PCI bus have been checked, the check-exception code sends an error log that may contain a listing of all the errors and associated error severity levels. The errors and associated error severity levels are prioritized according to each error's severity level.

FIG. 4 depicts a block diagram of a system for handling machine check interrupts without the necessity of powering down the system is depicted in accordance with the present invention. A machine check interrupt is an interrupt that operating systems, such as, for example, AIX, use when the data processing system detects that an adapter has failed. A catastrophic error that will always have AIX report a machine check is a system error (SERR). A SERR may be caused for various reasons such as, for example, parity errors. Parity errors may include data parity error during a special cycle and address parity errors. A SERR may also be cause by other critical error other than parity, such as, for example, a master abort error.

An operating system (OS) 402 executing within a data processing system, such as, for example, data processing system 200 in FIG. 2, includes an OS interrupt handler 404 for handling machine check interrupts occurring within the data processing system. OS 402 may be, for example, AIX. A run-time abstraction service (RTAS) 408 provides a mechanism for receiving machine check interrupts from PCI Host Bridges 410–412. In the present example, RTAS 408 is implemented within firmware. Firmware is software stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

The machine check interrupt indicates that one of I/O adapters 414–420, connected to PCI Host Bridges 210–212 is bad (i.e. has ceased to perform correctly). OS handler 404 makes calls to RTAS 408 to determine whether a machine check has occurred and RTAS 208 presents the machine check interrupt data to OS handler 204 in the form of an error log entry. An example of an error log entry is:

BFE4C025 0607120300 P H sysplanar0 MACHINE_CHECK_
CHRP

Such an error log entry indicates to OS 402 that machine check interrupt has been received indicating that an I/O adapter 422–428 identified by, for example, the ID "BFE4C025" has failed. OS handler 404 than posts data to error log 406 based on the information received from RTAS 408. Error log 500 in FIG. 5 depicts an exemplary table depicting possible contents and information contained within an error log in accordance with the present invention, depicting possible contents and information contained within error log 406.

The contents of error log 406 indicates which of I/O adapters 414–420 is bad, if RTAS 408 is able to determine such information. Otherwise, the entry in error log 406 merely reflects the fact that a machine check interrupt has occurred within the data processing system without indicating which of I/O Adapters 414–420 caused the machine check interrupt.

Once OS handler 404 has written to error log 406, OS 402 analyzes error log 406 to determine the identity of the failing I/O adapter 422–428. For example, an AIX operating system may analyze error log 406 using the "DIAG" command and produce the following result:

A03–030: I/O bus time-out, access, or other error
n/a      FRU:n/a      U0.1-P1-I3

The data structure of the form "U0.X" indicates by "X" the drawer number of the bad adapter. Thus, in the example of above, "U0.1" (X=1), indicates that the drawer number of the bad adapter is "1." The data structure of the form "IY" indicates the slot number of the bad adapter where "Y" is the slot number. Thus, in the example above, the bad adapter is in slot 3, drawer 1.

If OS interrupt handler 404 is unable to determine the one of I/O adapters 414–420 that failed, then the data processing system is powered off. If, however, OS interrupt handler 404 is able to determine the one of I/O adapters 413–420 that failed, then operating system 202 will call RTAS 408 hot plug to disable the failing I/O adapter 414–420 and deallocate any processes bound to the failing one of I/O adapters 414–420.

Once the failing one of I/O adapters 414–420 is disabled, an urgent sysplanar message can be sent to a user notifying the user of the bad adapter, such as, for example, via a page, a message to a video display terminal, and/or blinking lights on the slot containing the bad adapter. An urgent sysplanar is a message that the system will output to an output device, typically at predefined time intervals, so that a user may be alerted the adapter is no longer working.

The user will then be able to replace the bad adapter, re-enable the adapter, using the hotplug feature provided by OS 402, RTAS 408, and EADS 414 and 418 working in concert. The user may then reconfigure the adapter once replaced.

Those of ordinary skill in the art will appreciate that the hardware and software depicted in FIG. 4 may vary. For example, more or fewer I/O adapters may be used than those depicted in FIG. 4. The depicted example is not meant to imply architectural limitations with respect to the present invention.

Figure 6:
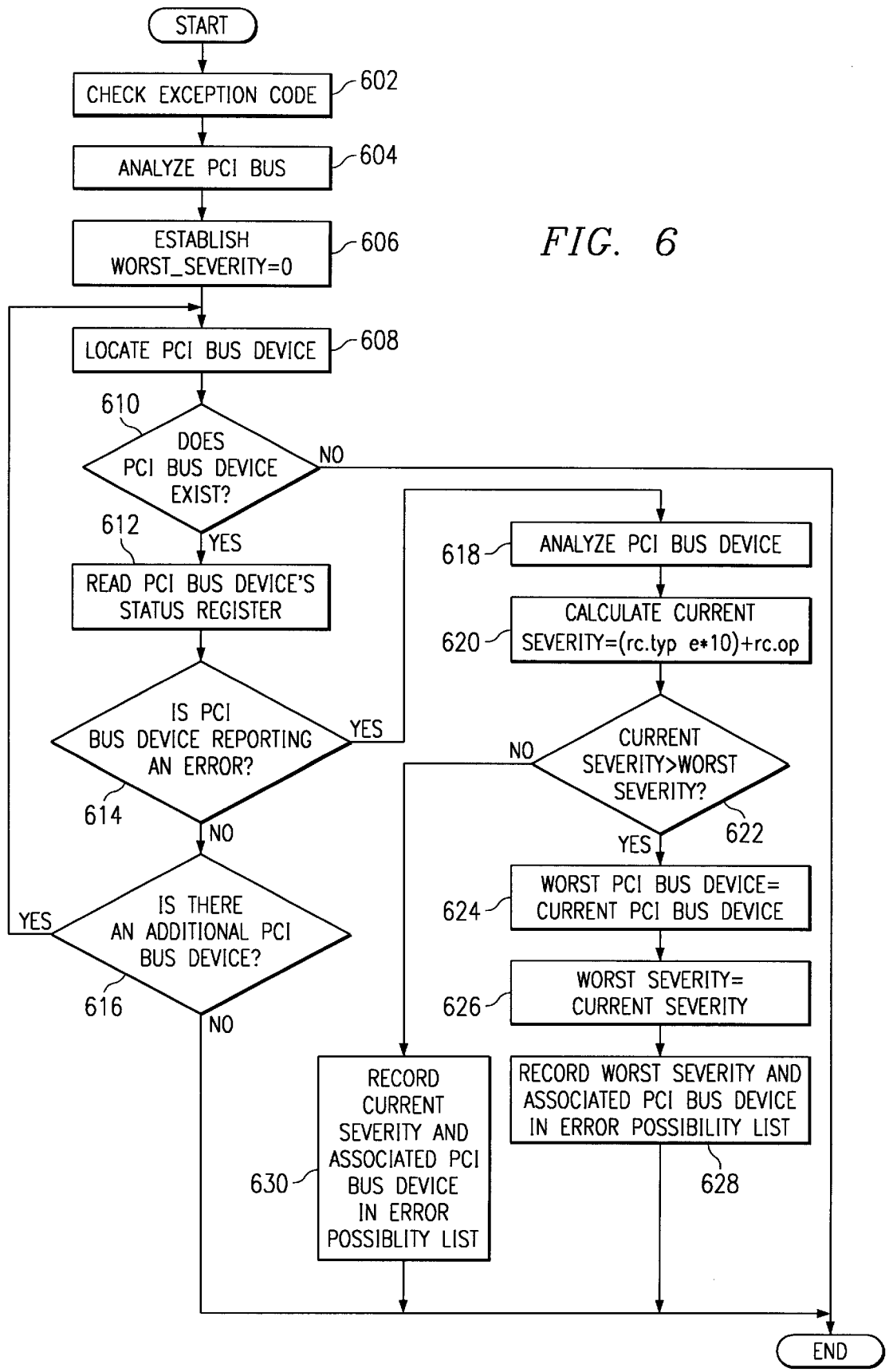
FIG. 6 depicts a flowchart illustrating an exemplary process of prioritizing multiple errors reported in an error log in accordance with a preferred embodiment of the present invention.

FIG. 6 depicts a flowchart illustrating an exemplary process of prioritizing multiple errors reported in an error log in accordance with a preferred embodiment of the present invention. In this example, the operation begins with checking an exception code (step 602). The exception code may be from a routine which is called by an operating system to isolate an error that caused an exception. Then a PCI bus is analyzed (step 604). Worst_severity of the PCI bus is established as "0" (step 606). A PCI bus device is located (step 608). Then a determination is made as to whether or not the PCI bus device exists (step 610). If the PCI bus device does not exist (step 610:NO), the operation ends. If the PCI bus device does exist (step 610:YES), a status register of the PCI bus device is read (step 612). Then a determination is made as to whether or not the PCI bus device is reporting an error (step 614). If the PCI bus device is not reporting an error (step 614:NO), a determination is made as to whether or not there is an additional PCI bus device (step 616). If there is not an additional PCI bus device (step 616:NO), the operation ends. If there is an additional PCI bus device (step 616:YES), the operation returns to step 608 in which the PCI bus device is located.

Returning to step 614, if the PCI bus device is reporting an error (step 614:YES), the PCI bus device reporting the error is analyzed (step 618). The current severity of the PCI bus device error is then calculated (step 620). The current severity of the PCI bus device error may be expressed as:

$$severity = (rc.type * 10) + rc.op$$

where rc.type is an error type and rc.op is an operation type.

Then a determination is made as to whether or not the current severity of the PCI bus error is greater than the worst severity PCI bus error (step 622). The worst severity of the PCI bus error may have been established from prior PCI bus device analyses. If the current severity of the PCI bus device error is not greater than the worst severity of the PCI bus device error (step 622:NO), the current severity of the PCI bus device error and associated PCI bus device is recorded and saved in an error possibility list (step 630) and thereafter the operation terminates. If the current severity of the PCI bus device error is greater than the worst severity of the PCI bus device error (step 622:YES), then the worst PCI bus device equals the current PCI bus device (step 624). The worst severity of the PCI bus device error equals the current severity of the PCI bus device error (step 626). The worst severity of the PCI bus device and the associated PCI bus device is then recorded and saved in the error possibility list (step 628) and thereafter the operation terminates.

Figure 7:
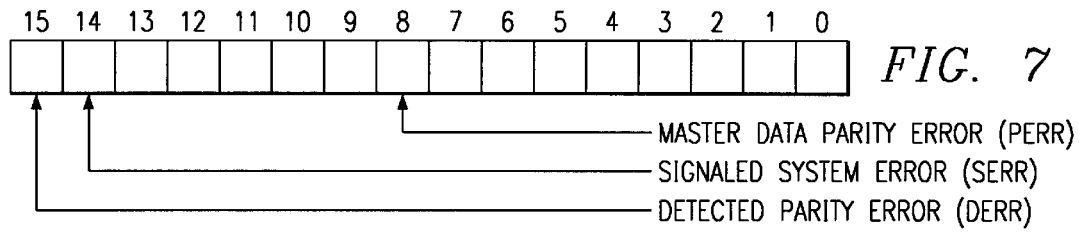
FIG. 7 is an exemplary example of a status bit assignment table in accordance with a preferred embodiment of the present invention.

FIG. 7 is an exemplary example of a status bit assignment table in accordance with a preferred embodiment of the present invention. In this example, master data parity error (PERR) is located at bit 8. Signaled system error (SERR) is located at bit 14 and detected parity error (DERR) is located at bit 15.

Figure 8A:
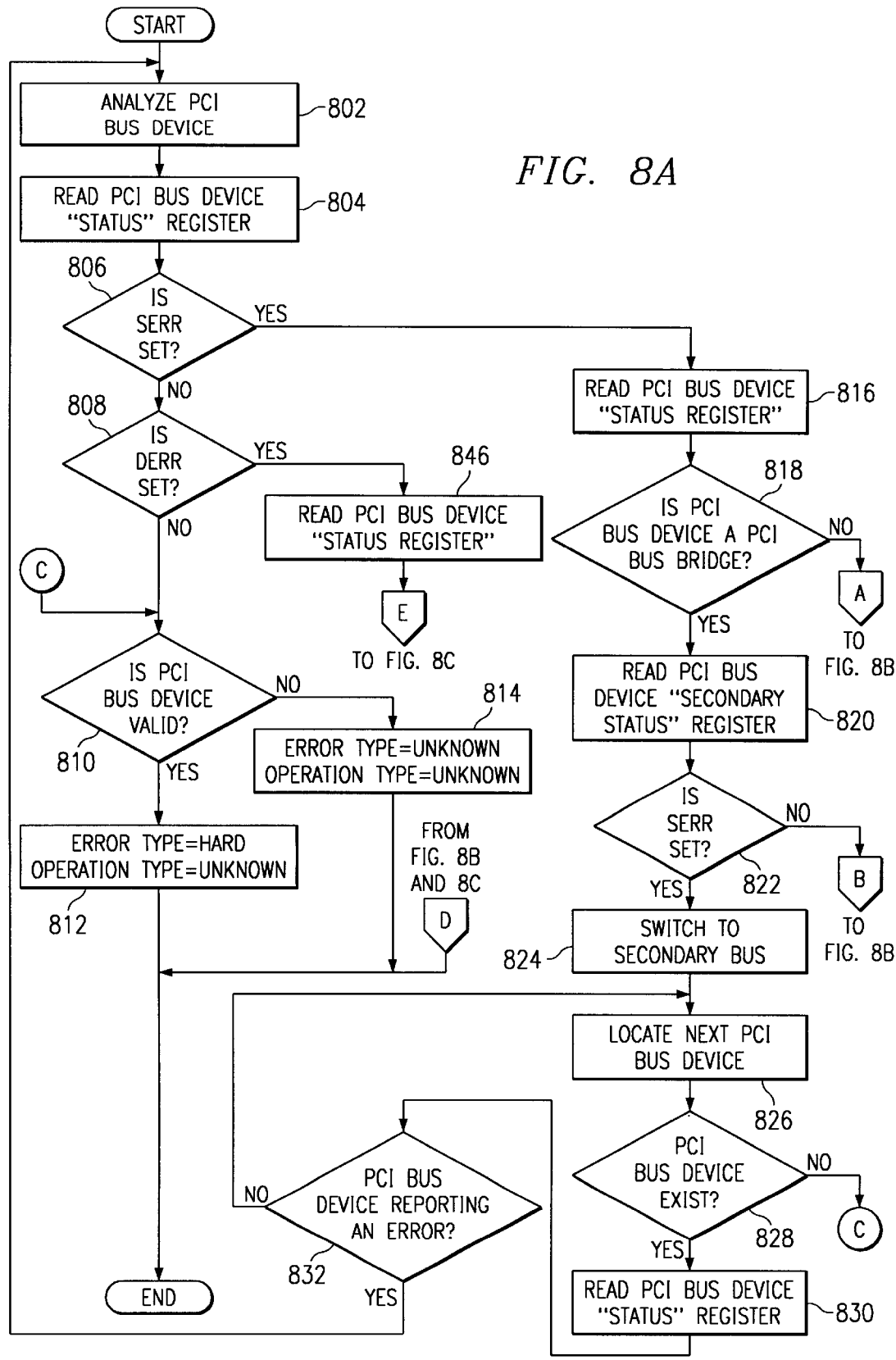
FIGS. 8A–8C depict an exemplary flowchart illustrating an exemplary process of applying a severity factor to a PCI bus device error in accordance with a preferred embodiment of the present invention.
Figure 8B:
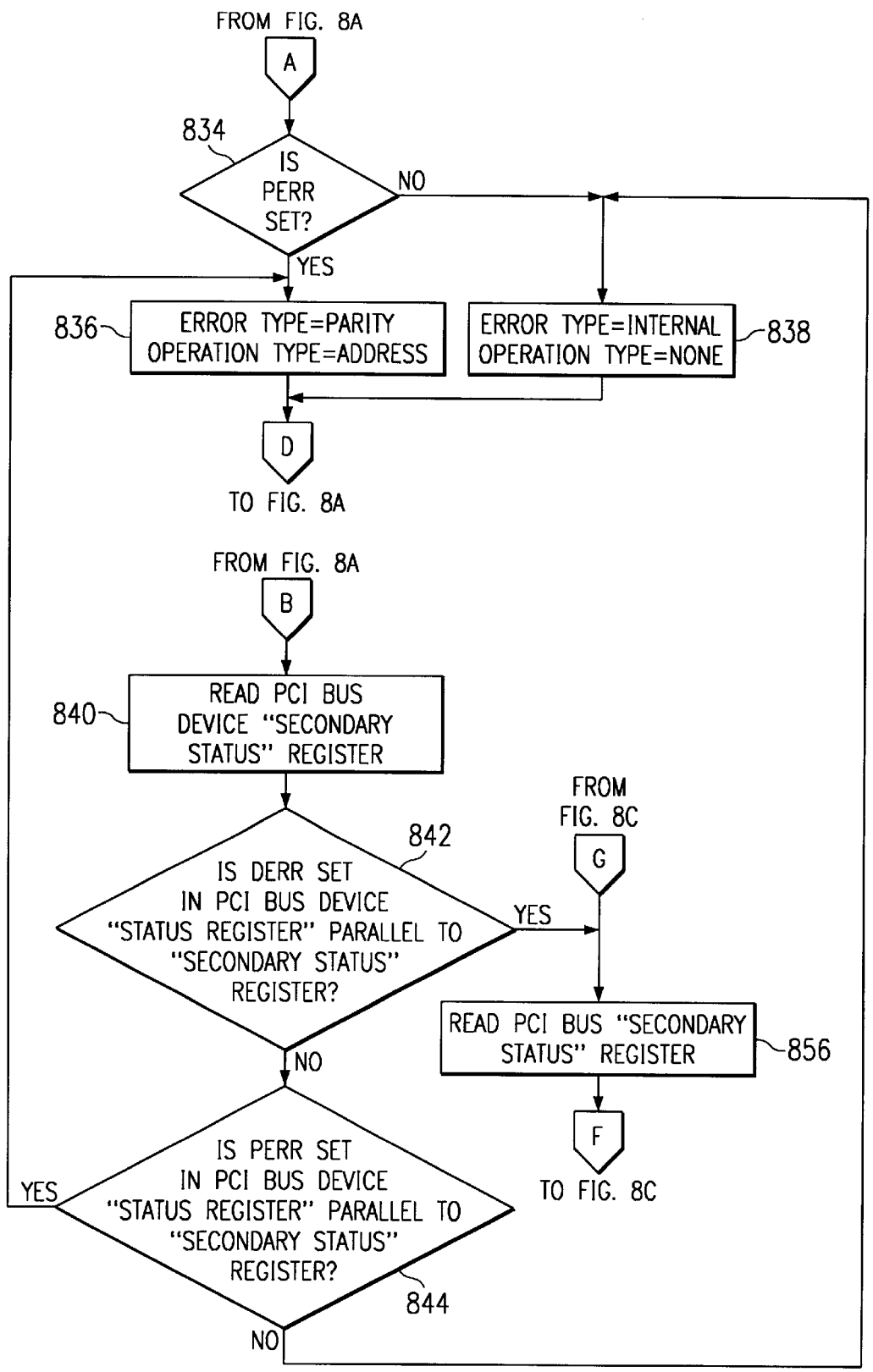
Figure 8C:
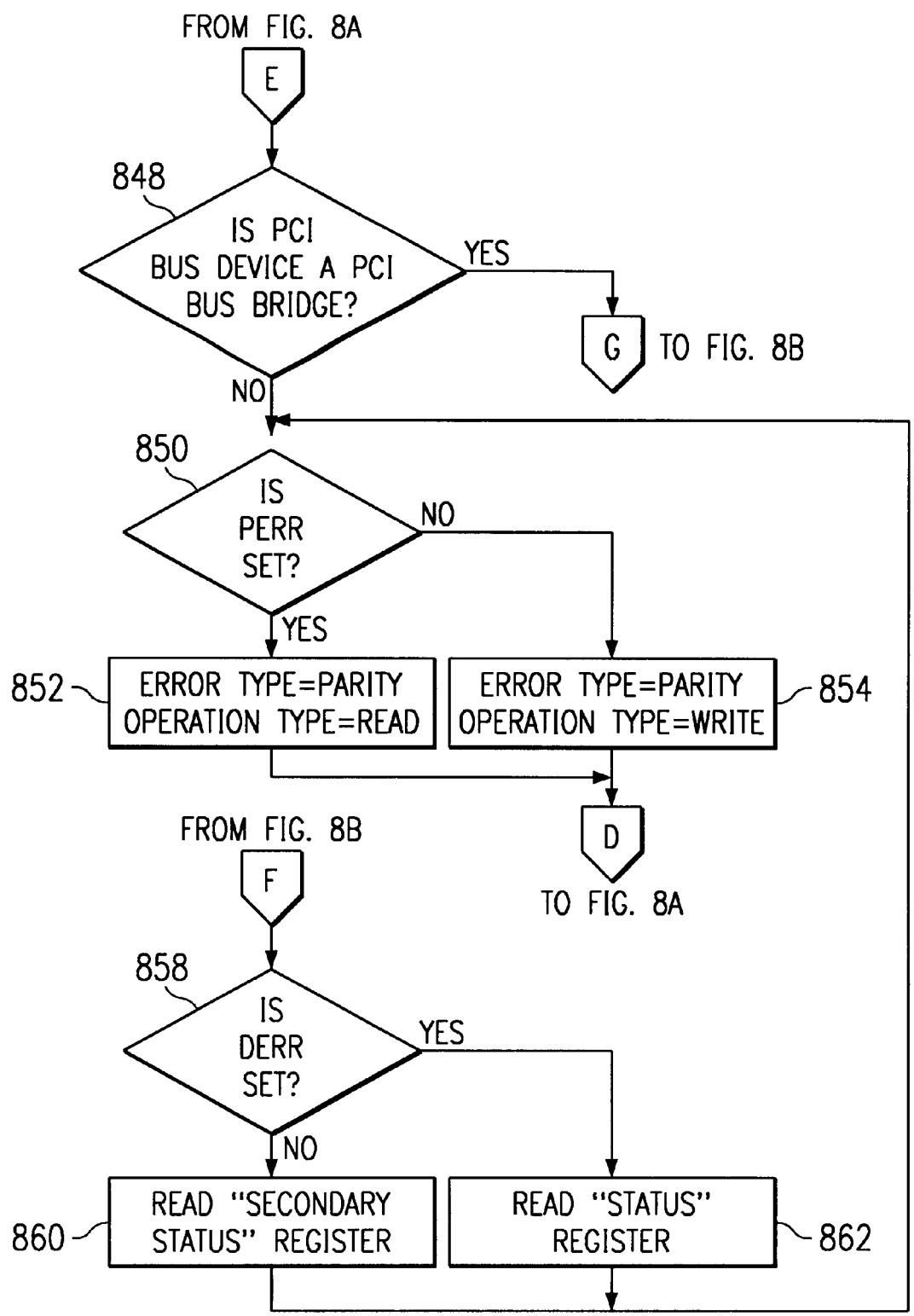

FIGS. 8A–8C depict an exemplary flowchart illustrating an exemplary process of applying a severity factor to an error in accordance with a preferred embodiment of the present invention. In this example, the operation begins by analyzing a PCI bus device (step 802). The PCI bus device "status" register is then read (step 804). Then a determination is made as to whether or not the SERR is set (step 806). If the SERR is not set, (step 806:NO), a determination is made as to whether or not the DERR is set (step 808). If the DERR is not set (step 808:NO), then a determination is made as to whether or not the PCI bus device is valid (step 810). If the PCI bus device is valid (step 810:YES), the error type is indicated as "hard" and the operation type is indicated as "unknown" (step 812) and thereafter the operation terminates. If the PCI bus is not valid (step 810:NO), the error type is indicated as "unknown" and the operation type is indicated as "unknown" (step 814) and thereafter the operation terminates.

Returning to step 808, if the DERR is set (step 808:YES), the PCI bus device "status" register is read (step 846). Then a determination is made as to whether or not the PCI bus device is a PCI bus bridge (step 848). If the PCI bus device is not a PCI bus bridge (step 848:NO), then a determination is made as to whether or not the PERR is set (step 850). If the PERR is set (step 850:YES), the error type is indicated as "parity" and the operation type is indicated as "read" (step 852) and thereafter the operation terminates. If the PERR is not set (step 850:NO), the error type is indicated as "parity" and the operation type is indicated as "write" (step 854) and thereafter the operation terminates.

Returning to step 848, if the PCI bus device is a PCI bus bridge (step 848:YES), the PCI bus device "secondary status' register is read (step 856). Then a determination is made as to whether or not the DERR is set (step 858). If the DERR is set (step 858:YES), the PCI bus device "status" register is read (step 862) and thereafter the operation returns to step 850 in which a determination is made as to whether or not the PERR is set. If the DERR is not set (step 858:NO), the PCI bus device "secondary status" register is read (step 860) and thereafter the operation returns to step 850 in which a determination is made as to whether or not the PERR is set.

Returning to step 806, if the SERR is set (step 806:YES), the PCI bus device "status" register is read (step 816). Then a determination is made as to whether or not the PCI bus device is a PCI bus bridge (step 818). If the PCI bus device is not a PCI bus bridge (step 818:NO), then a determination is made as to whether or not the PERR is set (step 834). If the PERR is not set (step 834:NO), the error type is indicated as "internal" and the operation type is indicated as "none" (step 838) and thereafter the operation terminates. If the PERR is set (step 834:YES), the error type is indicated as "parity" and the operation type is indicated as "address (step 836) and thereafter the operation terminates.

Returning to step 818, if the PCI bus device is a PCI bus bridge (step 818:YES), then the PCI bus device "secondary status" register is read (step 820). Then a determination is made as to whether or not the SERR is set (step 822). If the SERR is not set (step 822:NO), the PCI bus device "secondary status" register is read (step 840). Then a determination is made as to whether or not the DERR set in the PCI bus device "status" register is parallel to the PCI bus device "secondary status" register (step 842). If the DERR set in the PCI bus device "status" register is parallel to the PCI bus device "secondary status" register (step 842:NO), the operation continues to step 856 in which the PCI bus device "secondary status" register is read. If the DERR set in the PCI bus device "status" register is not parallel to the PCI bus device "secondary status" register (step 842:NO), a determination is made as to whether or not the PERR set in the PCI bus device "status" register is parallel to the PCI bus device "secondary status" register (step 844). If the PERR set in the PCI bus device "status" register is parallel to the PCI bus device "secondary status" register (step 844:YES), the error type is indicated as "parity" and the operation type is indicated as "unknown" (step 836) and thereafter the operation terminates. If the PERR set in the PCI bus device "status" register is not parallel to the "secondary status" register (step 844:NO), the error type is indicated as "internal" and the operation type is indicated as "none" (step 838) and thereafter the operation terminates.

Returning to step 822, if the SERR is set (step 822:YES), then a switch is made to a secondary bus (step 824). Then a next PCI bus device is located (step 826). Then a determination is made as to whether or not the PCI bus device exists (step 828). If the PCI bus device does not exists (step 828:NO), then the operation returns to step 810 in which a determination is made as to whether or not the PCI bus device is valid. If the PCI bus device does exist (step 828:YES), the PCI bus device "status" register is read (step 830). Then a determination is made as to whether or not the PCI bus device is reporting an error (step 832). If the PCI bus device is not reporting an error (step 832:NO), the operation returns to step 826 in which the next PCI bus device is located. If the PCI bus is reporting an error (step 832:YES), the operation returns to step 802 in which the PCI bus device is analyzed.

FIG. 9 depicts a flowchart illustrating an exemplary process of developing a systematic list for displaying errors prioritized by an error severity factor in accordance with a preferred embodiment of the present invention. In this example, the operation starts with logging of the PCI bus device error (step 902). Then standard error log details are created (step 904). The location of the worst PCI bus device is logged (step 906). An attempt is made to read an entry in the error possibilities list (step 908). Then a determination is made as to whether or not the error possibilities list exists (step 910). If the error possibilities list does not exist (step 910:NO), then the error log details are completed (step 914) and thereafter the operation terminates. If the error possibilities list does exist (step 910:YES), then a ">" (greater than) is added to the end of the PCI bus device location code (step 912). Then a location code for the PCI bus device is added in the error possibilities list (step 916). An attempt is then made to read a next entry in the error possibilities list (step 918). Then a determination is made as to whether or not the error possibilities list is empty (step 920). If the error possibilities list is not empty (step 920:NO), the operation returns to step 916 in which a location code for the PCI bus device is added in the error possibilities list. If the error possibilities list is empty (step 920:YES), then the error log details are completed (step 914) and thereafter the operation terminates.

FIG. 10 depicts a check-exception code to report the findings of errors back to an operating system in accordance with a preferred embodiment of the present invention. In this example, PCI bus error types 902 are monitored as well as PCI bus operational errors 904. PCI bus error types 902 may be made up of several error categories. In this example, PCI bus error type 902 may contain error classifications, for example, none, unknown, internal, hard and parity with a corresponding value associated with each error classification, for example values 0–4, respectively. Additionally, PCI bus error operations 904 may also contain error classifications, for example, none, unknown, data_ read, data_write and address with a corresponding value associated with each error operation classification, for example 0–4, respectively.

When each bus error value is determined, for example, type error value and operation error value, a severity level may be assessed. As illustrated by severity level calculation 906, the error type error value and the error operation error value may be combined. In one embodiment of the present invention, the severity level may be combined, for example, by utilizing the following equation:

$$\text{Severity level} = 10(\text{error type value}) \times (\text{error operation value})$$

For example, an internal error type such as, for example, a target_abort, may have a severity level of 20. An error type parity error and a operation address error combined, in a case, such as, for example, a parity-error may have a value of 44.

Therefore, the present invention provides for a method to prioritize multiple errors reported from a bus and order the errors in a systematic list. When a machine check is received an check-exception code searches through, for example, a PCI bus, reading error registers during the search. When an error is found the present invention analyses the error. Multiple errors may be detected, such as, for example, an error type and an error operation. The error may then be assigned a value based on the seriousness of the error. The error values may then be combined to calculate a error severity level.

With the processes of the present invention, a first error is recorded as the most severe error. The check-exception code continues to scan the bus for the presence of more errors. If another error is detected during the scanning process, then the additional error is analyzed. A severity level is calculated for the additional error and compared to the first error. If the additional error has a higher combined valued than the first error, the additional error is listed more prominently than the first error. However, if the first error value is remains as the highest detected error, the first error remains listed more prominently than the additional error. The analyzing of the bus continues until all items connected to the bus have been checked. Once all the items connected to the bus have been checked, the check-exception code sends an error log a listing of all the detected errors listed based on their corresponding severity levels. Thereby, with the use of the present invention, a system administrator or system technician is able to determine the cause of all faults on a bus as well as the faults which will have the highest probability of causing a catastrophic failure of the bus.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for prioritizing bus errors in a data processing system, the method comprising the steps of:
    (a) executing a subsystem test on a first subsystem from a plurality of subsystems on a bus system, wherein the subsystem test on the bus system is specific to the first subsystem;
    (b) receiving an output in response to executing the subsystem test;
    (c) in response to the output indicating an error on the first subsystem, assessing a severity level based on the error;
    wherein the error comprises at least one of an error type and an operation type; and
    wherein the operation type is one of address, data_read, data_write and unknown.

2. The method as recited in claim 1, further comprising:
    (d) repeating steps (a)–(c) for all subsystems from the plurality of subsystems on the bus system.

3. The method as recited in claim 2, further comprising:
    (e) compiling a list of a plurality of severity levels, wherein a security level within the list of the plurality of security levels is associated with a subsystem indicating an error;
    (f) comparing the plurality of severity levels within the list to one another; and
    (g) prioritizing the severity levels based on the comparison.

4. The method as recited in claim 3, further comprising:
    (h) associating a symbol with at least one severity level; and
    (i) displaying the symbol and the at least one severity level.

5. The method as recited in claim 4, wherein the at least one severity level is the highest severity level.

6. The method as recited in claim 3, wherein prioritizing the severity levels are prioritized from a highest severity level to a lowest severity level.

7. The method as recited in claim 1, wherein a severity level comprises at least one of an error type value and operation type value.

8. The method as recited in claim 7, wherein the error type value and the operation type value have a highest value of 4 and a lowest value of 0.

9. The method as recited in claim 1, wherein results of assessing the severity level based on the error are logged as a plurality of entries.

10. The method as recited in claim 9, wherein each entry in the plurality of entries is associated with only one subsystem from the plurality of subsystems.

11. The method as recited in claim 10, wherein each entry within the plurality of entries is associated with a location code.

12. The method as recited in claim 1, wherein the severity level is stored in a database.

13. The method as recited in claim 1, wherein the first subsystem is associated with a plurality of status registers.

14. The method as recited in claim 1, wherein the bus system includes at least one Peripheral Component Interconnect (PCI) device.

15. The method as recited in claim 1, wherein the error comprises at least one of an error type and an operation type.

16. The method as recited in claim 15, wherein the error type is one of parity, internal, hard and unknown.

17. A method for prioritizing bus errors in a data processing system, the method comprising the steps of:
    (a) executing a subsystem test on a first subsystem from a plurality of subsystems on a bus system, wherein the subsystem test on the bus system is specific to the first subsystem;
    (b) receiving an output in response to executing the subsystem test;

(c) in response to the output indicating an error on the first subsystem, assessing a severity level based on the error;

wherein a severity level comprises at least one of an error type value and operation type value; and wherein the severity level is expressed as a predetermined factor times the error type value plus the operation type value.

18. The method as recited in claim 17, wherein the predetermined factor is 10.

19. A computer program product, in a computer-readable medium, for prioritizing bus errors in a data processing system, comprising:

a) instructions for executing a subsystem test on a first subsystem from a plurality of subsystems on a bus system, wherein the subsystem test on the bus system is specific to the first subsystem;

(b) instructions for receiving an output in response to executing the subsystem test;

(c) instructions for, in response to the output indicating an error on the first subsystem, assessing a severity level based on the error;

wherein the error comprises at least one of an error type and an operation type; and wherein the operation type is one of address, data read, data write and unknown.

20. The computer program product as recited in claim 19, further comprising:

(d) instructions for repeating steps (a)–(c) for all subsystems from the plurality of subsystems on the bus system.

21. The computer program product as recited in claim 20, further comprising:

(e) instructions for compiling a list of a plurality of severity levels, wherein a security level within the list of the plurality of security levels is associated with a subsystem indicating an error;

(f) instructions for comparing the plurality of severity levels within the list to one another; and (g) instructions for prioritizing the severity levels based on the comparison.

22. The computer program product as recited in claim 21, further comprising:

(h) instructions for associating a symbol with at least one severity level; and (i) instructions for displaying the symbol and the at least one severity level.

23. The computer program product as recited in claim 22, wherein the at least one severity level is the highest severity level.

24. The computer program product as recited in claim 21, wherein prioritizing the severity levels are prioritized from a highest severity level to a lowest severity level.

25. The computer program product as recited in claim 19, wherein a severity level comprises at least one of an error type value and operation type value.

26. The computer program product as recited in claim 25, wherein the error type value and the operation type value have a highest value of 4 and a lowest value of 0.

27. The computer program product as recited in claim 25, wherein the severity level is expressed as a predetermined factor times the error type value plus the operation type value.

28. The computer program product as recited in claim 27, wherein the predetermined factor is 10.

29. The computer program product as recited in claim 19, wherein results of assessing the severity level based on the error are logged as a plurality of entries.

30. The computer program product as recited in claim 29, wherein each entry in the plurality of entries is associated with only one subsystem from the plurality of subsystems.

31. The computer program product as recited in claim 30, wherein each entry within the plurality of entries is associated with a location code.

32. The computer program product as recited in claim 19, wherein the severity level is stored in a database.

33. The computer program product as recited in claim 19, wherein the first subsystem is associated with a plurality of status registers.

34. The computer program product as recited in claim 19, wherein the bus system includes at least one Peripheral Component Interconnect (PCI) device.

35. The computer program product as recited in claim 20, wherein the error comprises at least one of an error type and an operation type.

36. The computer program product as recited in claim 35, wherein the error type is one of parity, internal, hard and unknown.

37. A system for prioritizing bus errors in a data processing system, comprising:

(a) executing means for executing a subsystem test on a first subsystem from a plurality of subsystems on a bus system, wherein the subsystem test on the bus system is specific to the first subsystem;

(b) receiving means for receiving an output in response to executing the subsystem test;

(c) assessing means for, in response to the output indicating an error on the first subsystem, assessing a severity level based on the error;

wherein the error comprises at least one of an error type and operation type; and wherein the operation type is one of address, data read, data write and unknown.

38. The system as recited in claim 37, further comprising:

(d) repeating means for repeating steps (a)–(c) for all subsystems from the plurality of subsystems on the bus system.

39. The system as recited in claim 38, further comprising:

(e) compiling means for compiling a list of a plurality of severity levels, wherein a security level within the list of the plurality of security levels is associated with a subsystem indicating an error;

(f) comparing means for comparing the plurality of severity levels within the list to one another; and (g) prioritizing means for prioritizing the severity levels based on the comparison.

40. The system as recited in claim 39, further comprising:

(h) associating means for associating a symbol with at least one severity level; and (i) displaying means for displaying the symbol and the at least one severity level.

\* \* \* \* \*

UNITED STATES PATENT AND TRADEMARK OFFICE
CERTIFICATE OF CORRECTION

PATENT NO. : 6,834,363 B2
DATED : December 21, 2004
INVENTOR(S) : Austen et al.

Page 1 of 1

It is certified that error appears in the above-identified patent and that said Letters Patent is hereby corrected as shown below:

<u>Column 13,</u>
Lines 25-26, after "addresses," delete "data read, data write" and insert -- data_read, data_write --.

<u>Column 14,</u>
Line 20, after "claim" delete "20" and insert -- 19 --.
Line 38, before "operation" insert -- an --.
Lines 39-40, after "addresses," delete "data read, data write" and insert -- data_read, data_write --.

Signed and Sealed this

Eleventh Day of April, 2006

JON W. DUDAS
*Director of the United States Patent and Trademark Office*